(12) United States Patent
Moriwaki et al.

(10) Patent No.: US 8,408,002 B2
(45) Date of Patent: Apr. 2, 2013

(54) GAS TURBINE COMBUSTOR

(75) Inventors: Atsushi Moriwaki, Hyogo (JP); Masataka Ohta, Hyogo (JP); Keijiro Saitoh, Hyogo (JP); Satoshi Tanimura, Hyogo (JP); Shinji Akamatsu, Hyogo (JP); Norihiko Nagai, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1027 days.

(21) Appl. No.: 11/574,203

(22) PCT Filed: Sep. 1, 2005

(86) PCT No.: PCT/JP2005/015989
§ 371 (c)(1),
(2), (4) Date: Nov. 2, 2007

(87) PCT Pub. No.: WO2006/027989
PCT Pub. Date: Mar. 16, 2006

(65) Prior Publication Data
US 2008/0184708 A1 Aug. 7, 2008

(30) Foreign Application Priority Data
Sep. 10, 2004 (JP) ................. 2004-264725

(51) Int. Cl.
*F02C 1/00* (2006.01)

(52) U.S. Cl. .................................................... 60/747

(58) Field of Classification Search ............... 60/737, 60/746–748, 752
See application file for complete search history.

(56) References Cited

U.S. PATENT DOCUMENTS

| | | | |
|---|---|---|---|
| 5,359,847 A | 11/1994 | Pillsbury et al. | |
| 6,038,861 A * | 3/2000 | Amos et al. | 60/737 |
| 6,068,467 A * | 5/2000 | Mandai et al. | 431/174 |
| 6,594,999 B2 * | 7/2003 | Mandai et al. | 60/722 |
| 6,634,175 B1 * | 10/2003 | Kawata et al. | 60/746 |
| 6,732,528 B2 * | 5/2004 | Akagi et al. | 60/752 |
| 6,742,338 B2 * | 6/2004 | Tanaka et al. | 60/737 |
| 6,772,594 B2 | 8/2004 | Nishida et al. | |

FOREIGN PATENT DOCUMENTS

| | | |
|---|---|---|
| JP | 07-248118 A | 9/1995 |
| JP | 9-166326 A | 6/1997 |
| JP | 11-223341 A | 8/1999 |
| JP | 2001-324144 A | 11/2001 |
| JP | 2002-61841 A | 2/2002 |
| JP | 2002-372240 A | 12/2002 |
| JP | 2003-14232 A | 1/2003 |
| WO | 98/40670 A1 | 9/1998 |

OTHER PUBLICATIONS

International Search Report of PCT/JP2005/015989, date of mailing Dec. 6, 2005.
German Office Action dated Jan. 15, 2010, issued in corresponding German Patent Application No. 112005002065.7.
International Search Report mailed Dec. 6, 2005 of International Application No. PCT/JP2005/015989.
Office Action issued Feb. 14, 2007 in corresponding Japanese Patent Application No. 2004-264725. Partial translation provided.

* cited by examiner

Primary Examiner — Phutthiwat Wongwian
(74) Attorney, Agent, or Firm — Westerman, Hattori, Daniels & Adrian, LLP

(57) ABSTRACT

A gas turbine combustor includes a pilot burner, a plurality of main burners disposed around the main burners on the radially outer side. Each of the main burners (2) includes an extension tube disposed at the downstream end. The outlet of the extension tube is shaped to have a radial edge which is parallel to the radial direction. In this manner, occurrence of flashback is effectively prevented.

14 Claims, 16 Drawing Sheets

A-A'

GAS TURBINE COMBUSTOR

TECHNICAL FIELD

The present invention relates to a gas turbine combustors, in particular, a gas turbine combustor with main burners for achieving premix combustion.

BACKGROUND ART

A gas turbine combustor adopting premix combustion is provided with a pilot burner for diffusion combustion in addition to main burners for premix combustion. This aims to stable the premix combustion. The diffusion flame generated by the pilot burner is used as pilot flame for the main burner to generate premix flame, thereby stabling the premix combustion. In a general gas turbine combustor, main burners are disposed around a pilot burner at regular intervals.

FIG. 1 shows a typical configuration of a gas turbine combustor adopting premix combustion (See Japanese Laid-Open Patent Applications Nos. 2001-324144 and 2002-61841). A typical gas turbine burner is provided with a pilot burner 1, a plurality of main burners 2 disposed around the pilot burner 1 at regular intervals and a combustor inner liner 3. The pilot burner 1 and the main burners 2 are accommodated in the combustor inner liner 3.

The pilot burner 1 has a cylindrical burner outer liner 11, a pilot swirler 12 and a pilot nozzle 13. The burner outer liner 11 accommodates the pilot swirler 12 and the pilot nozzle 13 therein. A pilot cone 14 is connected to the front end of the burner outer liner 11. Injected into the pilot cone 14 are fuel from the pilot nozzle 13 and swirled airflow from the pilot swirler 12, to achieve diffusion combustion within and downstream of the pilot cone 14.

The main burners 2 are provided with a cylindrical burner outer liner 21, main swirlers 22 and a main nozzle 23. FIG. 3 is a sectional view showing detailed configuration of the main burners 2. The burner outer liners 21 accommodate the main swirlers 22 and the main nozzles 23 therein. The main nozzles 23 are provided with a nozzle rod 23a and nozzle wings 23b. The nozzle wings 23b are provided with nozzle holes for injecting fuel 23c. Extension tubes 24 are connected to the burner outer liners 21 at the front ends. As shown in FIG. 2, the cross section of the extension tubes 24 at the front ends is different in shape from that at the connecting portions with the burner outer liners 21. The cross section of the extension tubes 24 is circular at the connecting portions with the burner outer liners 21, while the cross section of the extension tubes 24 is continuously varied toward the front end and elliptical at the outlets.

The main burners 2 with such configuration generate premix gas by mixing fuel and air therein, and inject the generated premix gas from the front ends of the extension tubes 24. In more detail, as shown in FIG. 3, the fuel 23c is injected to air 2a supplied from a compressor (not shown) by the main nozzles 23 at the upstream of the main swirlers 22 and the flow of the air 2a and the fuel 23c is swirled by the main swirlers 22. Accordingly, the air 2a is mixed with the fuel 23c to generate a flow 24a of the swirled premix gas (swirl flow). The generated premix gas is injected from the extension tubes 24 and burned downstream of the extension tubes 24 by using the diffusion flame generated by the pilot burner 1, thereby achieving the premix combustion.

Due to the low flow rate in the vicinity of the inner wall surfaces of the extension tubes 24, flashback is easy to occur. To prevent the flashback, flatted air (or film air) is taken from the connecting portions of the outer liners 21 and the extension tubes 24. More specifically, as shown in FIG. 3, the extension tubes 24 are inserted onto the outer side of the burner outer liners 21 so that the extension tubes 24 are separated from the burner outer liners 21. The separation of the burner outer liners 21 from the extension tube 24 is achieved by spacers 25. As shown in FIG. 4, the spacers 25 are disposed on the outer circumference of the burner outer liners 21 at regular intervals to provide gaps between the burner outer liners 21 and the extension tubes 24. The film air is taken through the gaps. The film air eliminates the low flow rate region in the vicinity of the inner wall surface of the extension tubes 24, thereby preventing occurrence of the flashback. The flattened air has a function of cooling the inner wall surface of the extension tubes 24. Since the premix combustion is performed downstream of the extension tubes 24, it is important to cool the extension tubes 24, especially, the inner wall surface of the extension tubes 24.

Referring back to FIG. 1, the pilot burner 1 and the main burners 2 are supported to a basal plate 4 by inserting the burner outer liners 11 and 21 into holes formed through the basal plate 4, respectively. More specifically, as shown in FIG. 5, a pilot burner support hole 5 and main burner support holes 6 are formed through the basal plate 4, to support the burner outer liners 11 and 21. The burner outer liner 11 of the pilot burner 1 is inserted into the pilot burner support hole 5 and the burner outer liners 21 of the main burners 2 are inserted into the main burner support holes 6. The pilot cone 14 of the pilot burner 1 and the extension tubes 24 of the main burners 2 are located downstream of the basal plate 4.

Additionally formed through the basal plate 4 are a lot of sweep air holes 7; it should be noted that only some of the sweep air holes 7 are shown. The sweep air holes 7 allow air from the compressor (not shown) to pass between the pilot burner 1 and the main burner 2 toward the downstream.

In the gas turbine combustor with such configuration, it is crucial to prevent backfire (flashback) of the main burners. Since the flashback causes burn-out of the combustor, the flashback must be suppressed as much as possible.

The inventors consider that the following three factors cause the flashback in the conventional gas turbine combustor. As shown in FIG. 6, a first factor is that low flow rate regions 26, where the premix gas flows at a low speed, are easily generated in the conventional gas turbine combustor, which is provided with the extension tubes 24 having the elliptical outlets. In the conventional gas turbine combustor, the premix gas tends to flow at a low speed in the region downstream of the extension tubes 24 and between two adjacent extension tubes 24 and the pilot cone 14 and in the region between the two adjacent extension tubes 24 and the combustor inner liner 3, and the low rate regions 26 are easily generated in these regions. The generation of the low rate regions 26 leads to backflow of flame to the extension tubes 24, in turn, the occurrence of the flashback.

As shown in FIG. 7, a second factor is that wakes 25a (or down stream vortexes) are generated at the downstream of the spacers 25 provided between the burner outer liners 21 and the extension tubes 24. Air flow passing between the burner outer liners 21 and the extension tubes 24 generates the wakes 25a at the downstream side of the spacers 25. The wakes 25a promotes the occurrence of the flashback.

As shown in FIG. 3, a third factor is that swirl centers 24b of swirl flows are easily generated downstream of the front end of the main nozzles 23. Since the premix gas flows at the swirl centers 24b at a low speed, the generation of the swirl centers 24b leads to the occurrence of the flashback. The flashback causes the generation of flame at the front end of the main nozzles 23, thereby contributing to the burn-out of the main nozzles 23.

From such background, there is a need of a technique for effectively suppressing the occurrence of the flashback.

DISCLOSURE OF INVENTION

In summary, an object of the present invention is to provide a technique for effectively suppressing the occurrence of the flashback.

More specifically, one object of the present invention is to prevent occurrence of a low flow rate region where the premix gas flows at a low speed, thereby preventing the occurrence of the flashback.

Another object of the present invention is to avoid wakes being generated downstream of spacers provided a burner outer liner and an extension tube, thereby preventing the occurrence of the flashback.

In one aspect, a gas turbine combustor is provided with: a pilot burner; and a plurality of main burners disposed around the pilot burner, outside with respect with the radial direction. Each main burner includes an extension tube provided at the downstream end. An outlet of the extension tube is formed so as to have radial edges parallel to the radial direction.

More specifically, the outlet of the extension tube has two radial edges, and circumferential edges connecting the radial edges. It is preferred that corner portions at which the radial edges are connected with the circumferential edges are rounded.

When the gas turbine combustor further includes a basal plate for supporting the pilot burner and the main burners, the extension tubes are located downstream of the basal plate and the basal plate is provided with openings for allowing sweep air to flow therethrough toward the downstream side, it is preferred that the opening ratio of the openings in regions between the extension tubes on the basal plate is larger than that of the openings in other regions. In this case, it is preferred that the opening ratio of the openings in regions between the adjacent extension tubes and inner than the extension tubes with respect to the radial direction is larger than the opening ratio in other regions.

In another aspect, a gas turbine combustor is provided with: a pilot burner; a plurality of main burners disposed around the pilot burner, outside with respect to the radial direction; and a basal plate for supporting the pilot burner and the main burners. Each main burner is provided with an extension tube provided at the downstream end and a main swirler for swirling the premix gas and feeding the premix gas to the extension tube. The extension tube is located downstream of the basal plate. The basal plate has openings for allowing sweep air to flow therethrough toward the downstream side. The openings are formed so that the sweep air is swirled in the same direction as the swirl direction of the premix gas.

In still another aspect, a gas turbine combustor is provided with: a pilot burner; and a plurality of main burners disposed around the pilot burner, outside with respect to the radial direction. Each main burner includes the extension tube provided at its downstream end, while an outlet of the extension tube is elongated so as to extend in the longitudinal direction, and the longitudinal direction of the outlet of the extension tube is oriented diagonally with respect to the radial direction. Preferably, the outlet of the extension tube is shaped into an ellipse having a major axis parallel to the longitudinal direction and the major axis forms an angle other than 90 degrees with the radial direction.

In still another aspect, a gas turbine combustor is provided with a burner for premix combustion. The burner is provided with: a burner outer liner which accommodates a nozzle for injecting fuel to air and a swirler for swirling premix gas containing fuel and air; an extension tube inserted onto the downstream end of the burner outer liner so as to be located outside of the burner outer liner; and a plurality of spacers which are provided outside of the burner outer liner between the burner outer liner and the extension tube and are separated from each other. The spacers are tapered down toward the downstream side.

In still another aspect, a gas turbine combustor is provided with a burner for premix combustion. The burner is provided with: a burner outer liner which accommodates a nozzle for injecting fuel to air and a swirler for swirling premix gas containing fuel and air; an extension tube inserted onto the downstream end of the burner outer liner so as to be located outside of the burner outer liner; and a spacer which is provided outside of the burner outer liner between the burner outer liner and the extension tube. The spacer has an opening which is gradually enlarged toward the downstream side.

In place of the spacer having the opening gradually enlarged toward the downstream side, a spacer formed of a porous body may be used.

In either case, it is preferred that the spacer is shaped into a ring and connected to the outer side of the burner outer liner so as to surround the burner outer liner.

In still another aspect, a gas turbine combustor is provided with a burner for premix combustion. The burner is provided with: a burner outer liner which accommodates a nozzle for injecting fuel to air and a swirler for swirling premix gas containing fuel and air; and an extension tube inserted onto the downstream end of the burner outer liner so as to be located outside of the burner outer liner. The burner outer liner is comprised of an outer liner body and a front end portion which is provided at the downstream end of the outer liner body and is smaller than the outer liner body in diameter. The extension tube is inserted onto the burner outer liner so as to contact against the outer liner body and be opposed to the front end portion at the position downstream of the outer liner body, and has an opening at the position opposed to the front end portion.

It is preferred that the opening is located so as to satisfy the following equation:

$$L/g>2,$$

which is represented by a radial width g of a gap between the front end portion and the extension tube and a distance L between the downstream end of the opening and the downstream end of the front end portion along the extension tube.

It is preferred that the burner further includes a guide which is provided outside of the extension tube and guides air to the opening. Typically, the guide has a connecting portion connected to the extension tube at the position downstream of the opening and an opposing portion which extends upstream from the connecting portion and is located as opposed to the opening.

According to the present invention, the occurrence of the flashback can be suppressed.

BEST MODE FOR CARRYING OUT THE INVENTION

Figure 1:
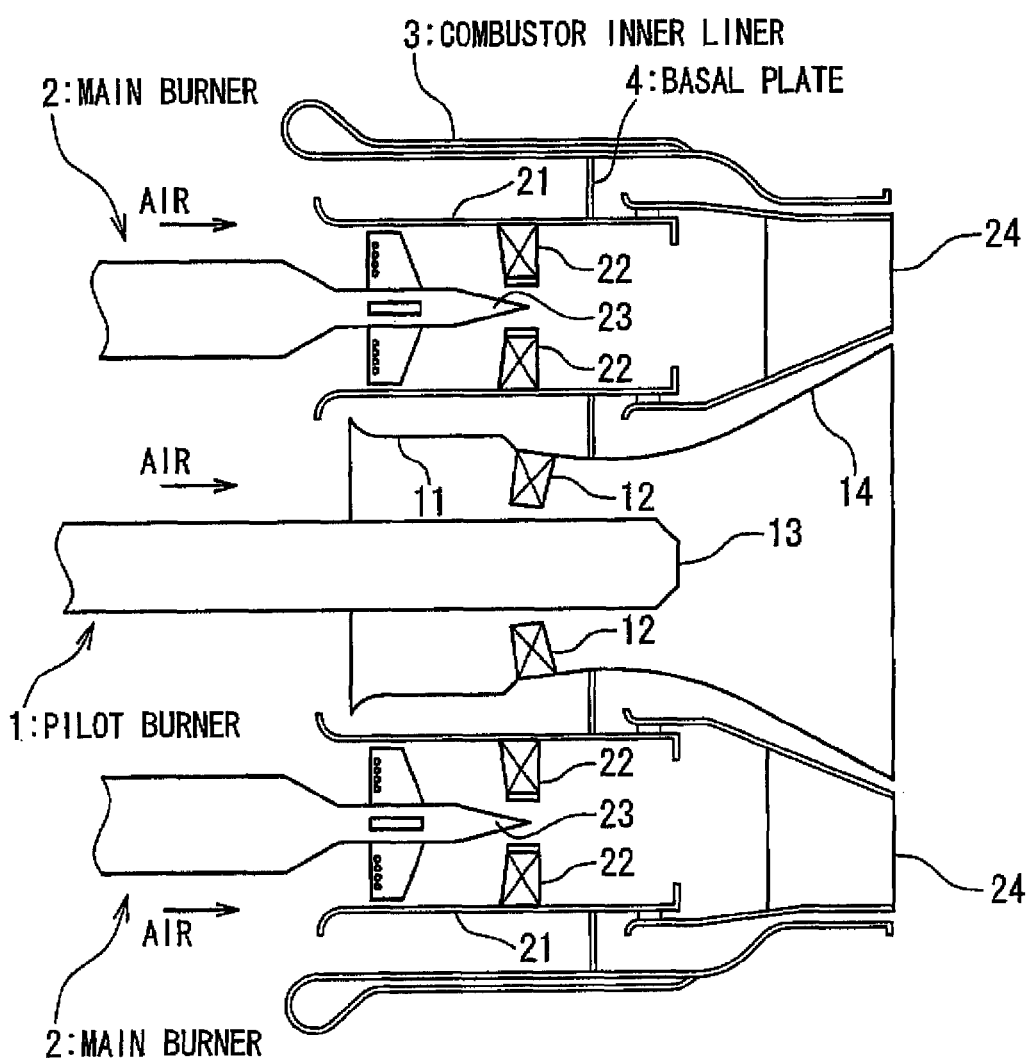
FIG. 1 is a schematic view showing configuration of a cross section of a conventional combustor.
Figure 2:
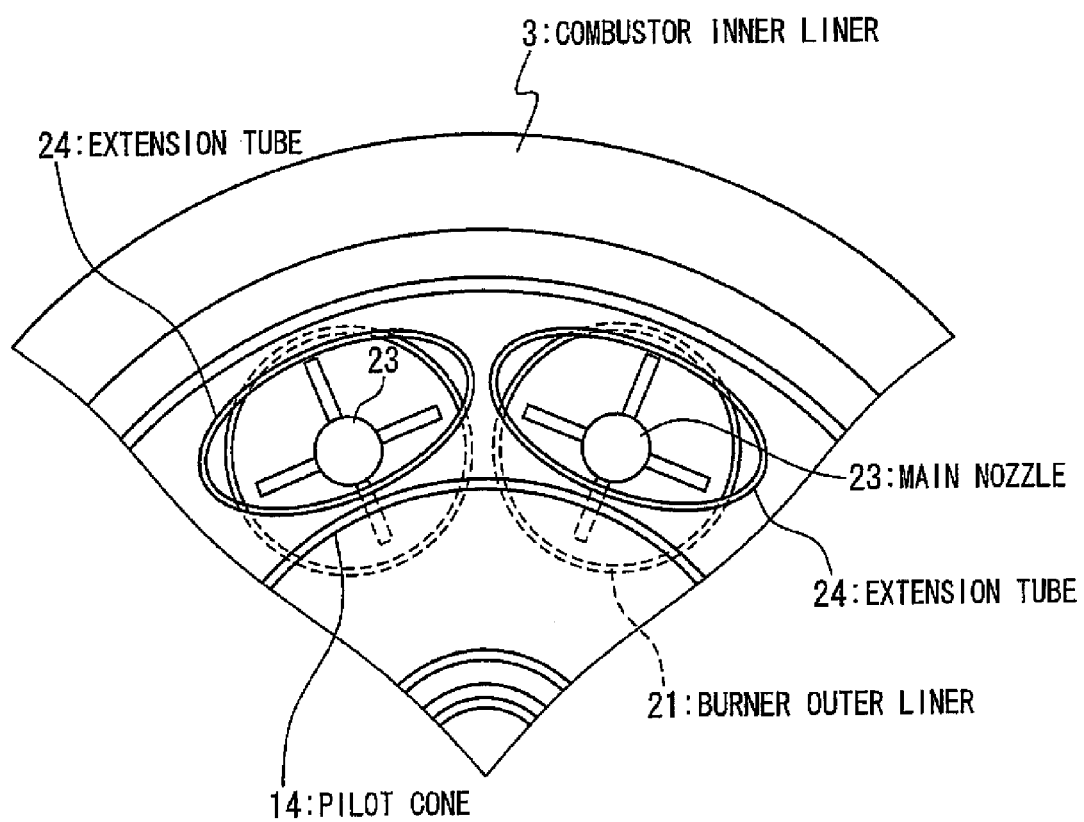
FIG. 2 is a schematic view showing configuration of the conventional combustor when viewed from a downstream side.
Figure 3:
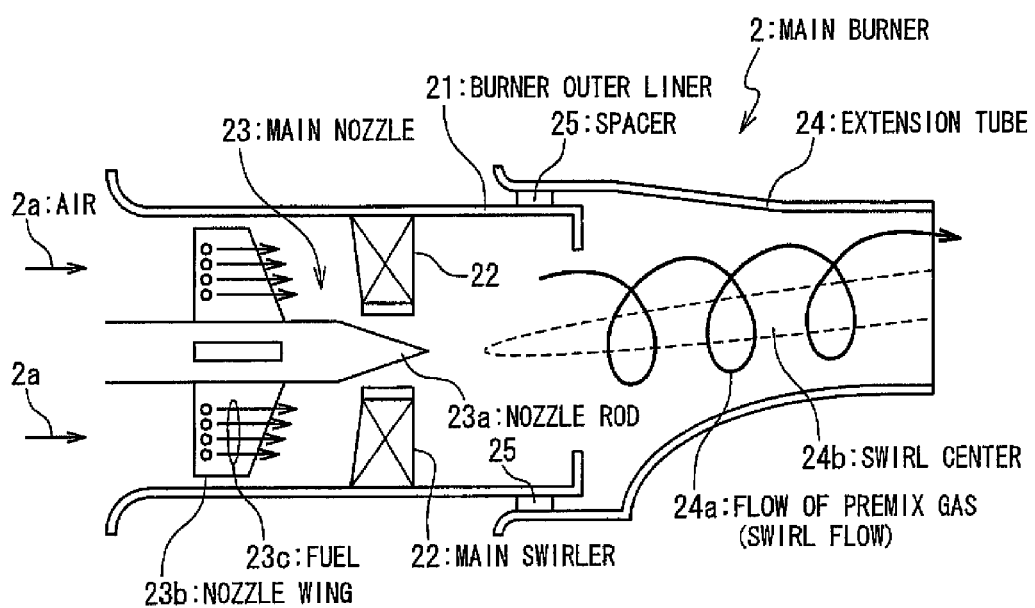
FIG. 3 is a schematic view showing configuration of a main burner of the conventional combustor.
Figure 4:
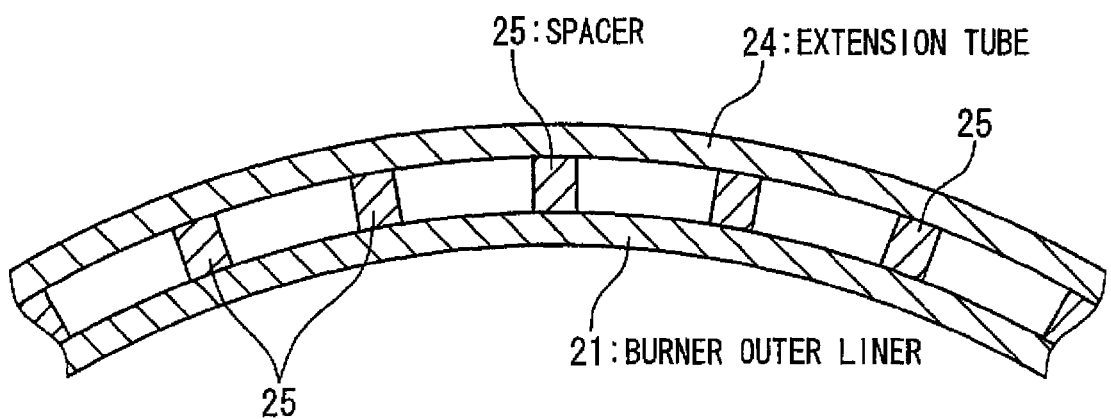
FIG. 4 is a sectional view showing configuration of a connecting portion of a burner outer liner and an extension tube of the main burner in the conventional combustor.
Figure 5:
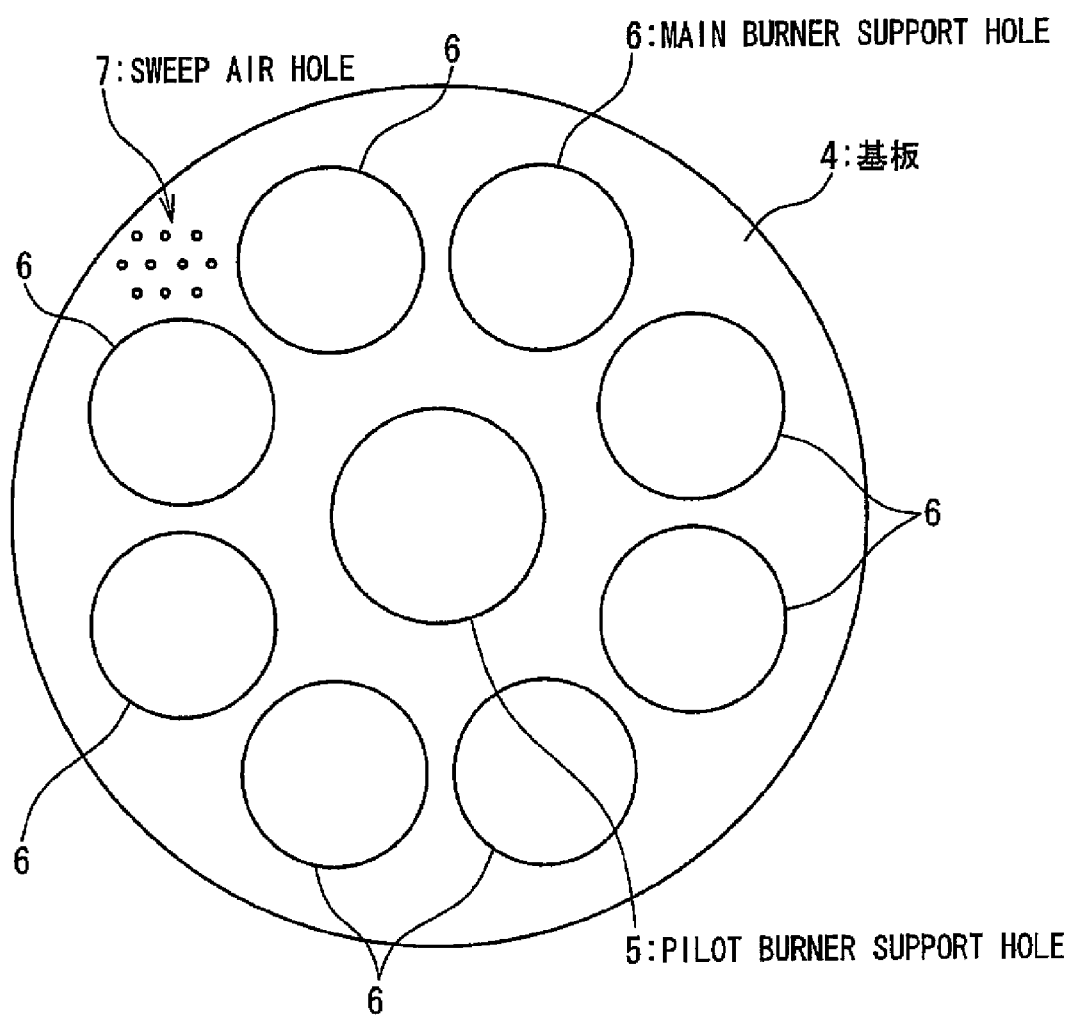
FIG. 5 is a schematic view showing configuration of a basal plate for supporting a pilot burner and main burners in the conventional combustor.

Gas turbine combustors according to the present invention will be described below referring to attached drawings. In the drawings, same, similar, or corresponding elements are denoted by same or corresponding reference numerals.

First Embodiment

Figure 6:
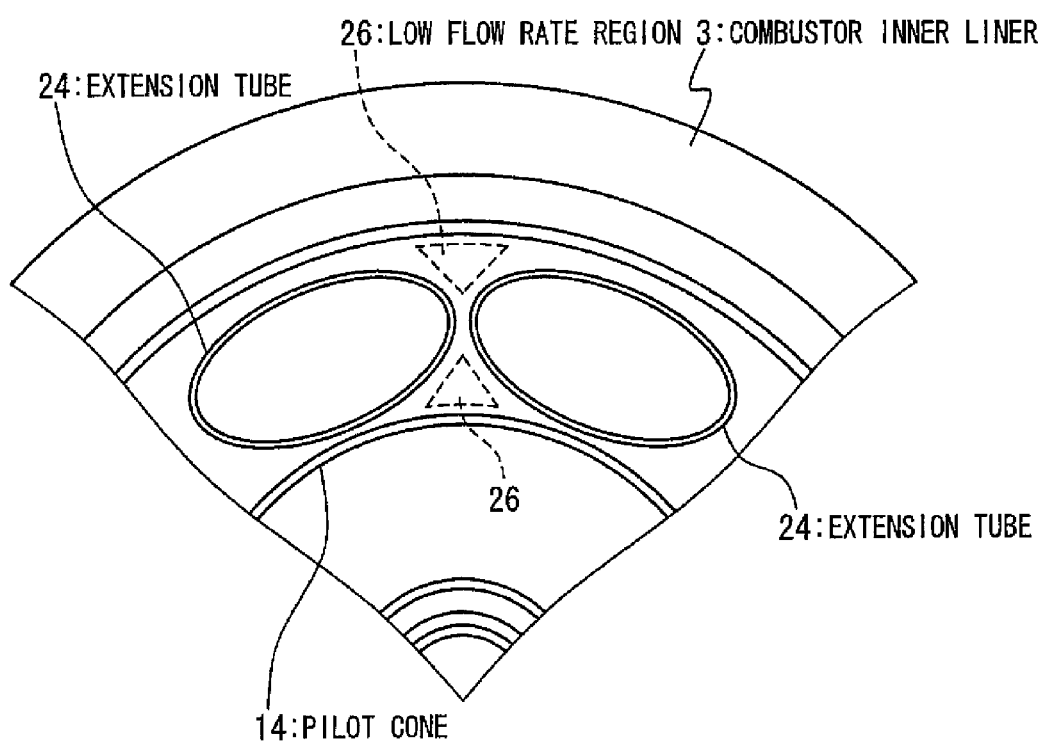
FIG. 6 is a view for explaining low flow rate regions, which are easily generated in the conventional combustor.
Figure 8:
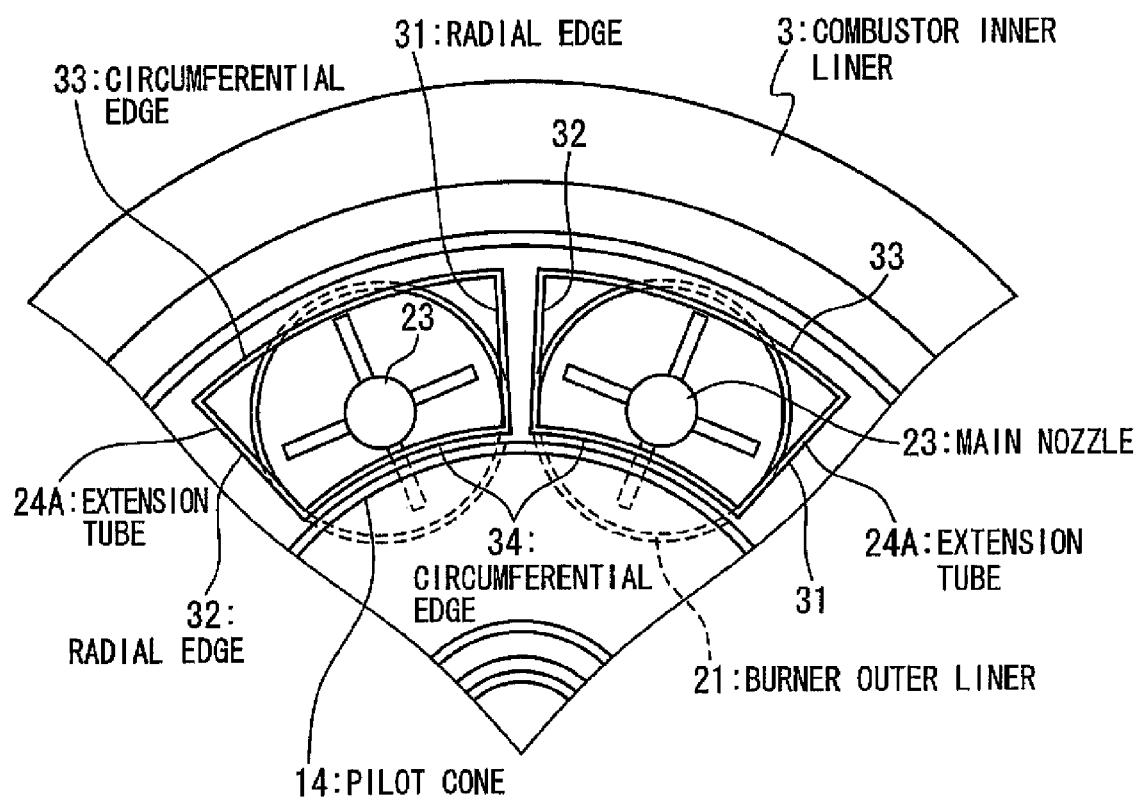
FIG. 8 is a view showing configuration of extension tubes of a combustor in accordance with a first embodiment of the present invention.

In a first embodiment of the gas turbine combustor in accordance with the present invention, as shown in FIG. 8, the generation of low flow rate regions 26 shown in FIG. 6 is prevented by using extension tubes 24A each having a substantially rectangular, not elliptical, outlet. In detail, the outlet of each extension tube 24A has radial edges 31 and 32 extending in the radial direction of the combustor and circumferential edges 33 and 34 connecting the radial edge 31 to the radial edge 32. The circumferential edges 33 and 34 may be bent, more specifically, may be each a portion of a concentric circle. The circumferential edges 33 and 34 may be straight instead.

The fact that the outlets of the extension tubes 24A have the radial edges 31 and 32 extending in the radial directions of the combustor is effective for suppressing the generation of the low flow rate regions 26 shown in FIG. 6. This owes to the fact that such shaped extension tubes 24A decrease regions between the burner inner tube 3 and the pilot cone 14 into which the premix gas does not flow from the extension tubes 24A, that is, regions where the low flow rate regions 26 are easily generated. Suppressing the generation of the low flow rate regions 26 is effective for suppressing the occurrence of the flashback.

Figure 9:
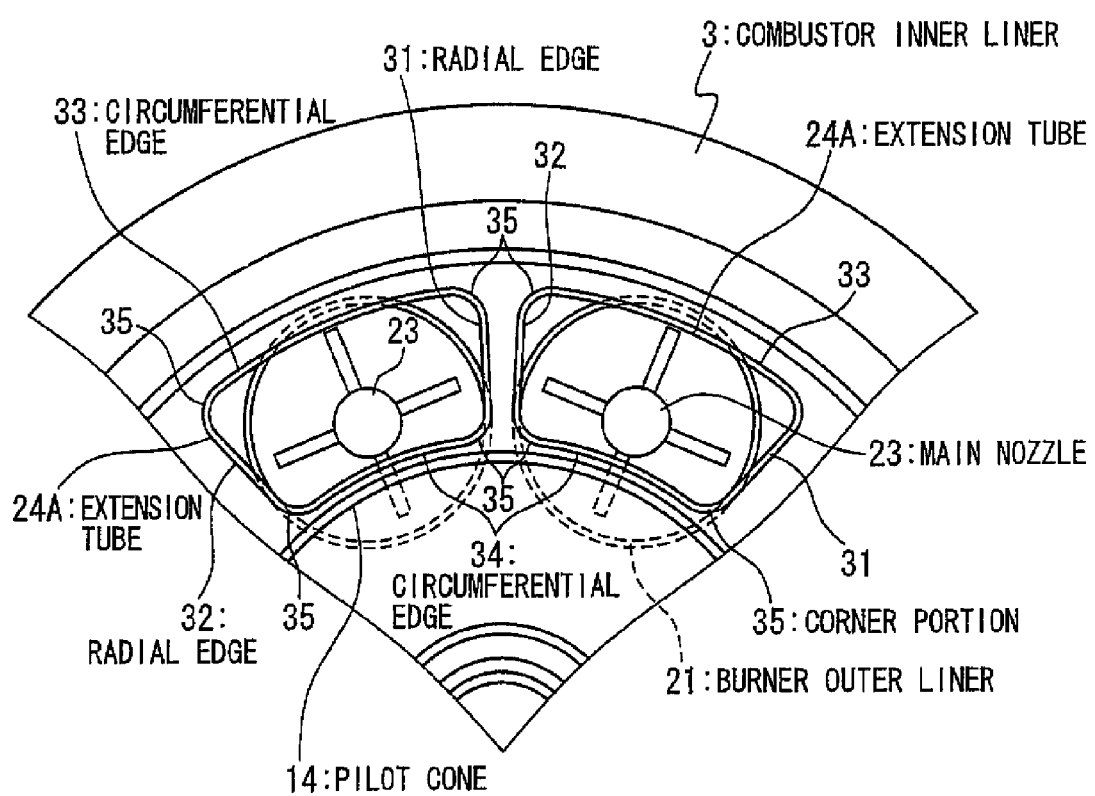
FIG. 9 is a view showing a preferred configuration of extension tubes of the combustor in accordance with the first embodiment of the present invention.

When the outlet of each extension tube 24A is angular at its four corners, swirls of the premix gas may be generated at the four corners r resulting in the flashback. To prevent generation of the swirls of the premix gas at the four corners of the outlets of the extension tubes 24A, as shown in FIG. 9, it is preferred that corner portions 35 connecting the radial edges 31 and 32 to the circumferential edges 33 and 34 are rounded. The extension tubes 24A thus shaped suppress the generation of swirls of the premix gas at the four corners, and therefore suppress the flashback.

Figure 10:
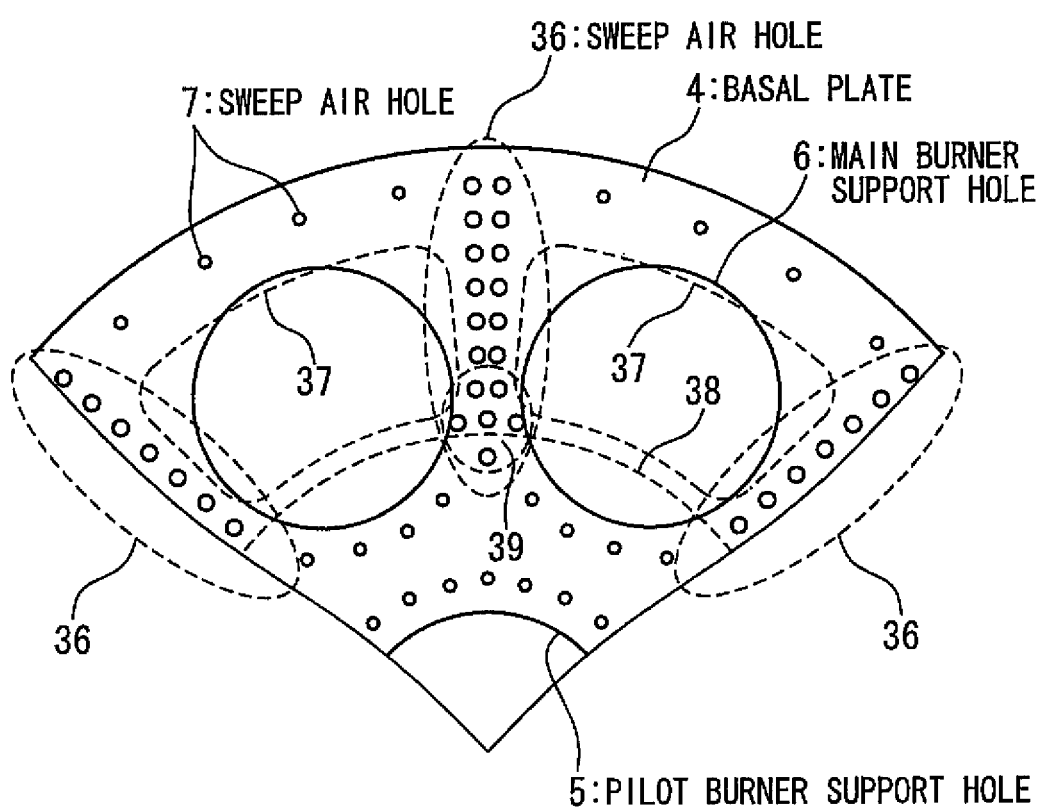
FIG. 10 is a view showing arrangement of sweep air holes formed through a basal plate of the combustor in accordance with the first embodiment of the present invention.

To further suppress the generation of the low flow rate regions 26, it is effective to flow an increased amount of sweep air between the adjacent extension tubes 24A. For this purpose, as shown in FIG. 10, it is preferred that sweep air holes 36 are provided at regions between the extension tubes 24A over the basal plate 4. In FIG. 10, the regions corresponding to the outlets of the extension tubes 24A are indicated by broken lines 37 and the region corresponding to the outlet of the pilot cone 14 is indicated by a broken line 38. Providing a lot of sweep air holes 36 in the regions between the extension tubes 24A through the basal plate 4 allows increased sweep air to flow between the extension tubes 24A, thereby suppressing the generation of the low flow rate regions 26.

It is understood the fact that the sweep air holes 36 are provided in the regions between the extension tubes 24A does not deny providing the sweep air holes 7 at other positions through the basal plate 4; it is effective for avoiding backflow to provide the sweep air holes 7 at other positions through the basal plate 4. The opening ratio of the sweep air holes 36 provided between the extension tubes 24A is made larger than that of the sweep air holes 7 at other positions. Here, the opening ratio refers to an area at which the sweep air holes 36 or the sweep air holes 7 are opened per unit area. In the present embodiment, the opening ratio in the regions between the extension tubes 24A is set larger than the opening ratio at the other positions by setting the diameter of the sweep air holes 36 larger than that of the sweep air holes 7. It is also preferred that the density at which the sweep air holes 36 are formed in the regions between the extension tubes 24A is made larger than the density at which the sweep air holes 7 are provided at other positions. Here, it should be noted that the density at which the sweep air holes 36 or the sweep air holes 7 are formed refers to the number of the sweep air holes 36 or the sweep air holes 7 per unit area.

To further suppress the flashback, it is preferred that the opening ratio of the sweep air holes 36 in regions 39 between the extension tubes 24A and on the inner side of the extension tubes 24A with respect to the radial direction (that is, the side of the pilot cone 14) is larger than the opening ratio at other positions. The increased opening ratio in the regions 39 leads to increase in the amount of sweep air between the extension tubes 24A and in the vicinity of the pilot cone 14. This also effectively suppresses the flashback which occurs due to transmission of frame from the diffusion flame generated by the pilot burner 1 to the premix flame generated by the main burners 2.

Figure 11A:
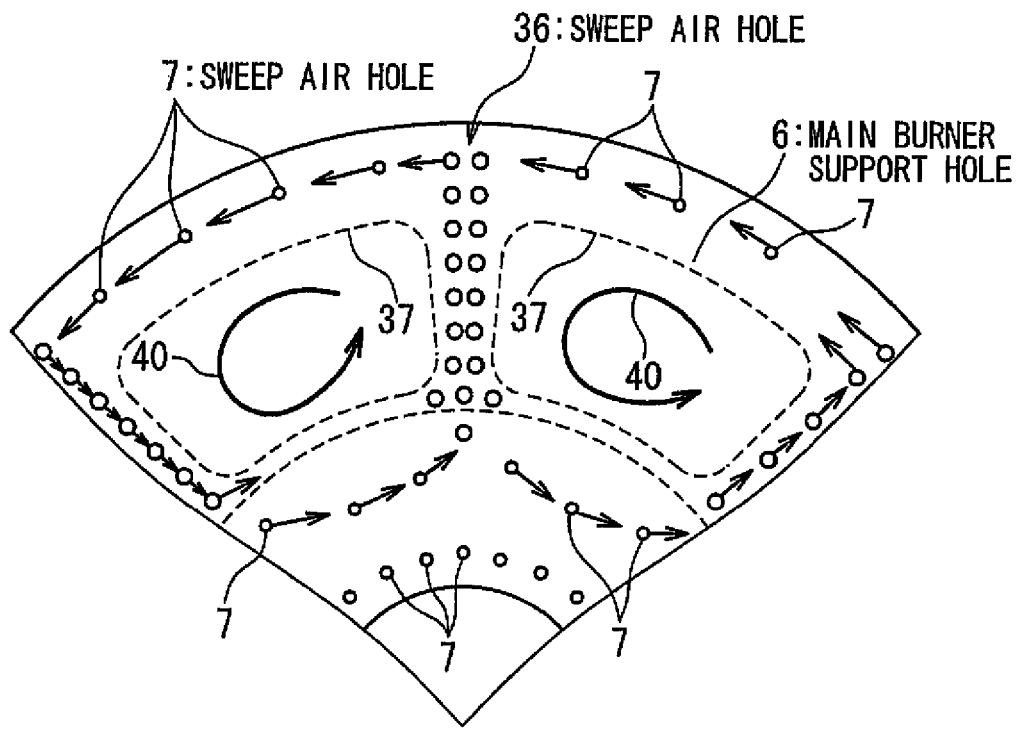
FIG. 11A is a view showing a preferred swirl direction of sweep air generated by the basal plate of the combustor in accordance with the first embodiment of the present invention.

It is preferred that flow of the sweep air introduced from the sweep air holes 36 and the sweep air holes 7 is swirled in the same direction as the swirl of the premix gas injected from the extension tubes 24. It should be noted that, in FIG. 11, arrows 40 indicate the swirl direction of the premix gas and arrows attached with the sweep air holes 36 and the sweep air holes 7 indicate the injecting direction of the sweep air. This aims to suppress mixture of the premix gas injected from the extension tubes 24 and the sweep air. In the case that the premix gas injected from the extension tubes 24 is mixed with the sweep air introduced from the sweep air holes 36 and the sweep air holes 7, the premix gas flows at a low speed in a region where the premix gas is mixed with the sweep air. Disadvantageously, the mixture of the premix gas and the sweep air may contribute to the flashback. Swirling the sweep air and the premix gas in the same direction suppress mixture of the sweep air and the premix.

Figure 11B:
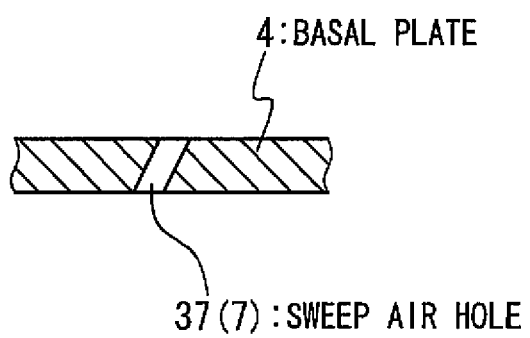
FIG. 11B is a view showing preferred shape of the sweep air holes.

In order to swirl the sweep air and the premix gas in the same direction, as shown in FIG. 11B, it is preferred to form the sweep air holes 36 and the sweep air holes 7 diagonally with respect to the surface of the basal plate 4. This allows the sweep air to be swirled with a simple configuration.

Figure 12:
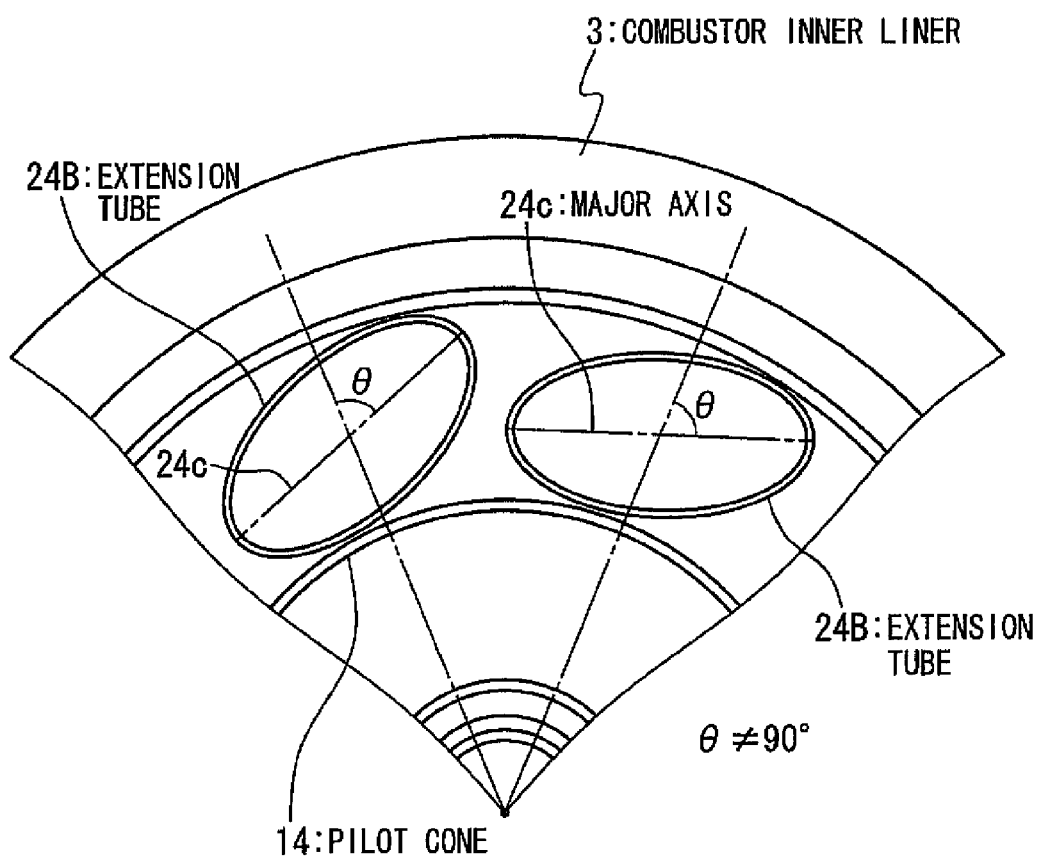
FIG. 12 is a view showing another configuration of the extension tubes of the combustor in accordance with the first embodiment of the present invention.

FIG. 12 shows another configuration of the gas turbine combustor preferable for suppressing the generation of the low flow rate regions 26 shown in FIG. 6. In the gas turbine combustor in FIG. 12, the outlets of the extension tubes 24B are elongated so as to extend in a certain direction (the longitudinal direction) and the longitudinal direction of the outlets of the extension tubes 24B is oriented diagonally with respect to the radial direction of the gas turbine combustor. In this embodiment, the outlets of the extension tubes 24B are elliptical and the extension tubes 24B are located diagonally with respect to the radial direction. More accurately, the major axes 24c of the outlets of the extension tubes 24B are oriented diagonally with respect to the radial direction of the combustor. In other words, the extension tubes 24B are located so that an angle θ formed between the major axes 24c and the radial direction of the combustor is not 90 degrees. Such arrangement suppresses the flashback, decreasing the region of space between the combustor inner liner 3 and the pilot cone 14 into which the premix gas does not flow from the extension tubes 24A, that is, the region where the low flow rate regions 26 are easily generated.

Second Embodiment

Figure 7:
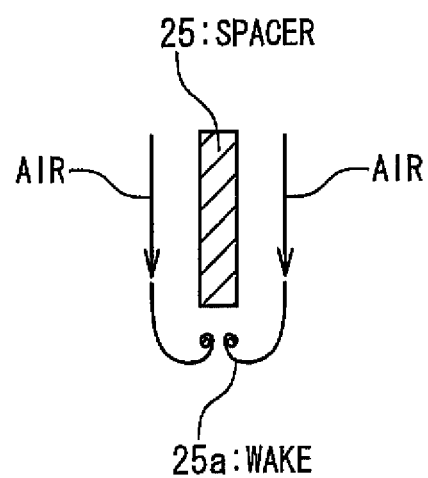
FIG. 7 is a view for explaining wakes generated downstream of the spacers provided at the connecting portion of the burner outer liner and the extension tube.

In A second embodiment, a technique is provided for suppressing the flashback caused by the wakes generated downstream of the spacers 25, which separate the burner outer liners 21 from the extension tubes 24 of the main burners 2 (see FIG. 7).

Figure 13A:
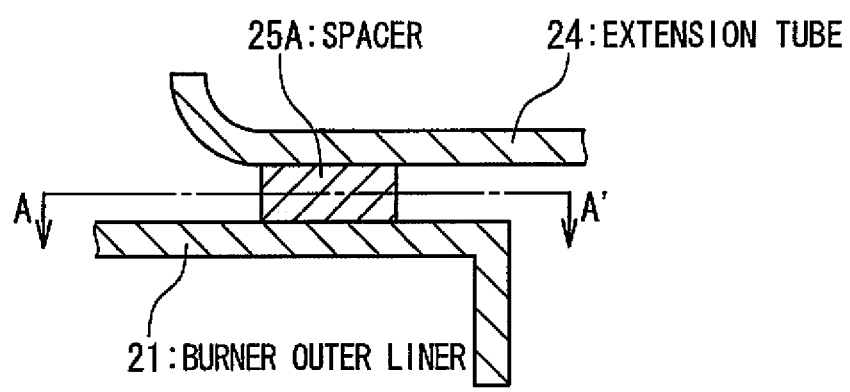
FIG. 13A is a sectional view showing configuration of a connecting portion of the burner outer liner and the extension tube in accordance with a second embodiment of the present invention.
Figure 13B:
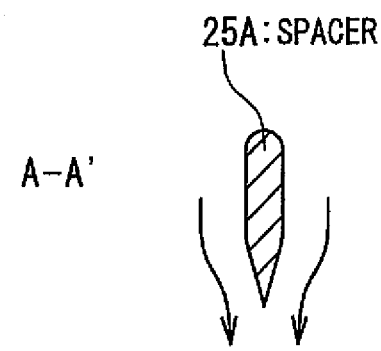
FIG. 13B is a view showing configuration of a cross section of a spacer provided at the connecting portion of the burner outer liner and the extension tube in accordance with the second embodiment of the present invention.

Referring to FIGS. 13A and 13B, the burner outer liners 21 are separated from the extension tubes 24 by the spacers 25A in the second embodiment. As shown in FIG. 13B, the spacers 25A each have a wing-like cross section. In other words, each spacer 25A is formed so that the cross section is tapered down toward the downstream of air flow. This avoids wakes being generated downstream of the spacers 25A, thereby suppressing the occurrence of the flashback.

Figure 14A:
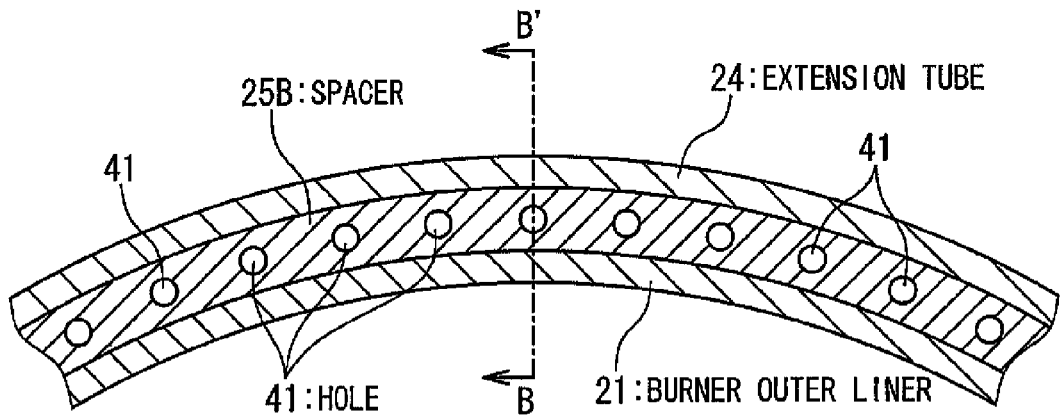
FIG. 14A is a view showing another configuration of the spacer provided at the connected portion of the burner outer liner and the extension tube in accordance with the second embodiment of the present invention.
Figure 14B:
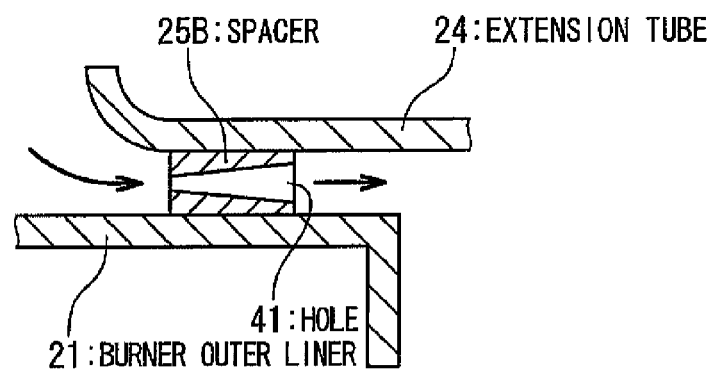
FIG. 14B is a view showing configuration of a cross section of the spacer shown in FIG. 14A.

As shown in FIGS. 14A and 14B, it is also preferred to use a ring-shaped spacer 25B with a lot of holes 41, in order to the flashback caused by the wake generated downstream of the spacers. The holes 41 are each shaped so that the outlet is larger than the inlet in diameter, that is, the diameter thereof is increased toward the downstream side. Taking film air through the holes 41 thus shaped avoids wakes being generated downstream of the spacer 25B, thereby suppressing the occurrence of the flashback.

Figure 15A:
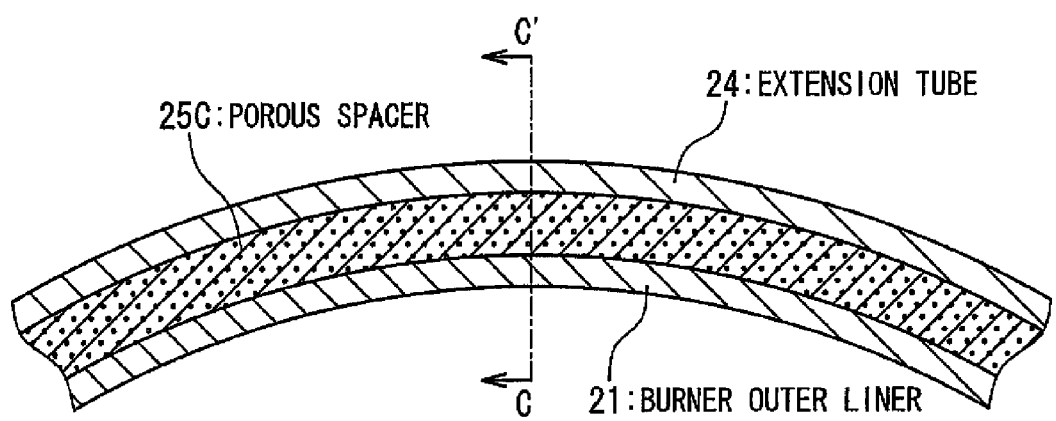
FIG. 15A is a view showing still another configuration of the spacer provided at the connecting portion of the burner outer liner and the extension tube in accordance with the second embodiment of the present invention.
Figure 15B:
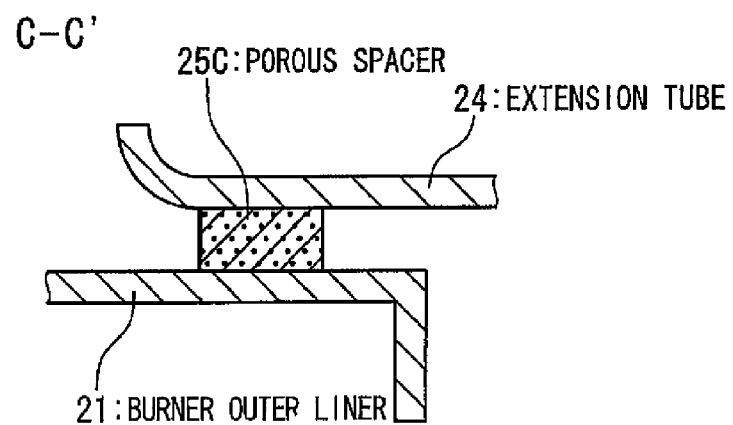
FIG. 15B is a view showing configuration of a cross section of the spacer shown in FIG. 15A.

As shown in FIGS. 15A and 15B, it is preferred that a spacer 25C formed of a porous body is used to separate the burner outer liners 21 from the extension tubes 24. Air passing through the porous spacer 25C is used as film air flowing along the inner surfaces of the extension tubes 24. The spacer 25C is typically formed of foamed metal or sintered metal.

Figure 16A:
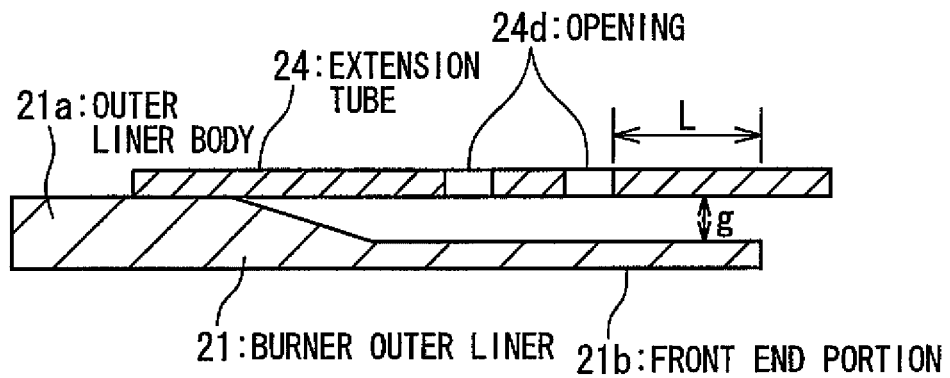
FIG. 16A is a sectional view showing another configuration of the connecting portion of the burner outer liner and the extension tube in accordance with the second embodiment of the present invention.

Furthermore, it is also preferred that the burner outer liners 21 are engaged with the extension tubes 24 as shown in FIG. 16A. Specifically, front end portions 21b having a smaller outer diameter than the outer liner bodies 21a are provided at the downstream ends of the outer liner bodies 21a of the burner outer liners 21. The extension tubes 24 are inserted onto the burner outer liners 21 so as to contact against the outer surfaces of the outer liner bodies 21a (not the front end portions 21b of the burner outer liners 21). The front end portions 21b of the burner outer liners 21 are formed as opposed to the inner surfaces of the extension tubes 24. Openings 24d are formed in regions of the extension tubes 24, which are opposed to the front end portions 21b. Air for cooling the film of the inner surfaces of the extension tubes 24 is taken through the openings 24d. The openings 24d are disposed in the circumferential direction of the extension tubes 24 at regular intervals. Plural lines of openings 24d may be aligned in the axial direction of the combustor. With respect to the engagement configuration shown in FIG. 16A, two lines of openings 24d are provided. The air taken through the openings 24d is guided downstream by the front end portions 21b of the burner outer liners 21 and flows along the inner surfaces of the extension tubes 24.

The engagement configuration as shown in FIG. 16A eliminates the necessity for providing spacers for separating the burner outer liners 21 from the extension tubes 24, and thereby solves the problem related the wakes generated downstream of the spacers.

It is preferred that openings 24d located at the most downstream position are positioned so as to satisfy the following equation:

$$L/g > 2, \qquad (1)$$

where g is a radial width of a gap between the front end portions 21b and the extension tubes 24, and L is a distance between the downstream ends of the openings 24d located at the most downstream position and the front ends of the front end portions 21b in the direction along the extension tubes 24. In order to sufficiently take air for film cooling through the openings 24d, it is effective to locate the openings 24d so as to satisfy the equation (1).

Figure 16B:
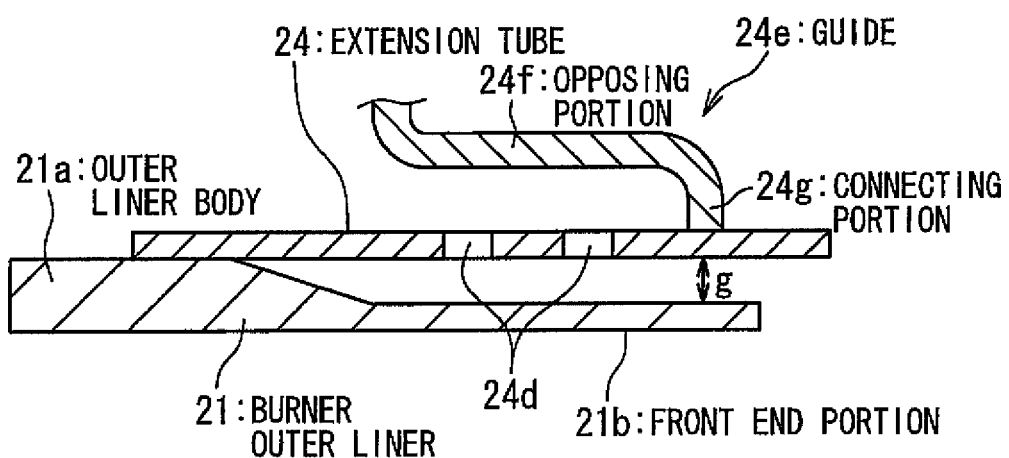
FIG. 16B is a sectional view showing a more preferable configuration of the connecting portion of the burner outer liner and the extension tube in accordance with the second embodiment of the present invention.

In order to sufficiently take air for film cooling through the openings 24d, as shown in FIG. 16B, it is also preferred that a guide 24e is provided for each extension tube 24. The guide 24e has an opposing portion 24f opposed to the portion of the extension tube 24 where the openings 24d are formed and a connecting portion 24g connected with the outer surface of the extension tube 24. The connecting portion 24g is connected to the extension tube 24 at the downstream of the positions where the openings 24d are formed. The upstream end of the opposing portion 24f is enlarged in diameter. The such-shaped guide 24e can introduce air into the openings 24d, thereby enabling air for generating film air to be sufficiently taken through the openings 24d.

The invention claimed is:

1. A gas turbine combustor comprising:
   a pilot burner;
   a plurality of main burners disposed around said pilot burner; and
   a basal plate for supporting said pilot burner and said main burners,
   wherein each of said main burners includes an extension tube provided at a downstream end thereof,
   wherein an outlet of said extension tube is formed so as to have two radial edges extending in a radial direction, and circumferential edges connecting said radial edges,
   wherein said extension tubes are located downstream of said basal plate, wherein and said basal plate is provided with openings for allowing sweep air to flow therethrough toward downstream, and
   wherein an opening ratio of said openings in regions between said extension tubes is set larger than an opening ratio of said openings in other regions by setting a diameter of said openings in the regions between said extension tubes larger than that of said openings in the other regions or by forming a larger number of said openings in the regions between adjacent radial edges of each of said extension tubes as compared to a number of said openings formed in the other regions of said basal plate.

2. The gas turbine combustor according to claim 1, wherein said outlet of said extension tube is shaped so that corner portions at which said radial edges are connected with said circumferential edges are rounded.

3. The gas turbine combustor according to claim 1, wherein an opening ratio of said openings in the regions between said extension tubes and the openings on the inner side of said extension tubes with respect to the radial direction of the gas turbine combustor is set larger than the opening ratio of said openings in other regions of said basal plate.

4. The gas turbine combustor according to claim 1, wherein each of said main burners further includes:
   a main swirler for swirling premix gas and feeding the premix gas to said extension tube;
   wherein said openings are formed so that said sweep air is swirled in the same direction as a swirl direction of said premix gas.

5. The gas turbine combustor according to claim 1, wherein each of said main burners further includes:
   a burner outer liner which accommodates a nozzle for injecting fuel to air and a swirler for swirling premix gas containing said fuel and said air; and
   a plurality of spacers provided outside of said burner outer liner between said burner outer liner and said extension tube, and separated from each other,
   wherein said extension tube is inserted onto a downstream end of said burner outer liner so as to be located outside of said burner outer liner, and
   wherein said spacers are tapered down toward downstream.

6. The gas turbine combustor according to claim 1, wherein each of said main burners further includes:
   a burner outer liner which accommodates a nozzle for injecting fuel to air and a swirler for swirling premix gas containing said fuel and said air; and
   a spacer provided outside of said burner outer liner between said burner outer liner and said extension tube,
   wherein said extension tube is inserted onto a downstream end of said burner outer liner so as to be located outside of said burner outer liner, and
   wherein said spacer has an opening which is gradually enlarged toward downstream.

7. The gas turbine combustor according to claim 6, wherein said spacer is shaped into a ring, and connected to an outer side of said burner outer liner so as to surround said burner outer liner.

8. The gas turbine combustor according to claim 1, wherein each of said main burners further includes:
   a burner outer liner which accommodates a nozzle for injecting fuel to air and a swirler for swirling premix gas containing said fuel and said air; and
   a spacer provided outside of said burner outer liner between said burner outer liner and said extension tube,
   wherein said extension tube is inserted onto a downstream end of said burner outer liner so as to be located outside of said burner outer liner, and
   wherein said spacer is formed of a porous body.

9. The gas turbine combustor according to claim 8, wherein said spacer is shaped into a ring, and connected to an outer side of said burner outer liner so as to surround said burner outer liner.

10. The gas turbine combustor according to claim 1, wherein each of said main burners further includes:
    a burner outer liner which accommodates a nozzle for injecting fuel to air and a swirler for swirling flow containing said fuel and said air to generate premix gas,
    wherein said burner outer liner comprises:
      an outer liner body; and
      a front end portion which is provided at a downstream end of said outer liner body, and is smaller than said outer liner body in diameter
    wherein said extension tube is inserted onto said burner outer liner so as to contact against said outer liner body and to be opposed to said front end portion at a position downstream of said outer liner body, and has an opening at a position opposed to said front end portion.

11. The gas turbine combustor according to claim 10, wherein said opening is located so as to satisfy the following equation:

$$L/g > 2,$$

which is represented by a radial width g of a gap between said front end portion and said extension tube and a distance L between a downstream end of said opening and a downstream end of said front end portion along said extension tube.

12. The gas turbine combustor according to claim 10, wherein said burner further includes a guide which is provided outside of said extension tube to guide air into said opening.

13. The gas turbine combustor according to claim 12, wherein said guide comprises:
    a connecting portion connected to said extension tube at a position downstream of said opening; and an opposed portion which extends upstream from said connecting portion and is located as opposed to said opening.

14. The gas turbine combustor according to claim 1, wherein:
said opening ratio of said openings in the regions between said adjacent extension tubes is set larger than said opening ratio of said openings in the other regions by setting a density of said openings in the regions between said adjacent extension tubes larger than a density of said openings in the other regions of said basal plate.

* * * * *

UNITED STATES PATENT AND TRADEMARK OFFICE
CERTIFICATE OF CORRECTION

PATENT NO.        : 8,408,002 B2
APPLICATION NO.   : 11/574203
DATED             : April 2, 2013
INVENTOR(S)       : Moriwaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1367 days.

Signed and Sealed this

First Day of September, 2015

Michelle K. Lee
*Director of the United States Patent and Trademark Office*